Dec. 10, 1963 G. J. PUTH 3,113,483

METHOD FOR REFORMING AND RELOADING USED SHOTGUN SHELLS

Filed Feb. 26, 1959 5 Sheets-Sheet 1

George J. Puth

INVENTOR.

BY Clarence A. O'Brien and Harvey B. Jacobson Attorneys

George J. Puth
INVENTOR.
BY Clarence A. O'Brien
and Harvey B. Jacobson
Attorneys

METHOD FOR REFORMING AND RELOADING USED SHOTGUN SHELLS

Filed Feb. 26, 1959 5 Sheets-Sheet 3

George J. Puth
INVENTOR.
BY Clarence A. O'Brien
and Harvey B. Jacobson
Attorneys

METHOD FOR REFORMING AND RELOADING USED SHOTGUN SHELLS

Filed Feb. 26, 1959

George J. Puth
INVENTOR.
BY Clarence A. O'Brien
and Harvey B. Jacobson
Attorneys

METHOD FOR REFORMING AND RELOADING USED SHOTGUN SHELLS

Filed Feb. 26, 1959

George J. Puth
INVENTOR.
BY Clarence A. O'Brien
and Harvey B. Jacobson
Attorneys United States Patent Office 3,113,483
Patented Dec. 10, 1963

3,113,483
METHOD FOR REFORMING AND RELOADING USED SHOTGUN SHELLS

George J. Puth, 625 W. Lawrence St., Appleton, Wis.

Filed Feb. 26, 1959, Ser. No. 795,720
17 Claims. (Cl. 86—23)

This invention comprises a novel and useful method for reforming and reloading used shotgun shells and more particularly relates to a method and an apparatus whereby used shotgun shells may be repeatedly reconditioned and reloaded for subsequent re-use.

When sportsmen engage in trap shooting or other gun club shoots, a large number of shells are usually fired. These are readily available for recovery. However, a considerable number of these are damaged and deformed more or less as by having the shell wall or the brass base crushed or bent as by being stepped upon. (For example, during the Grand American Match for the World Championship conducted by the Amateur Trap-Shooting Association in 1958, over 2000 entrans participated during the 10 day match, firing over 2,000,000 shells.) A considerable saving would be effected if such damaged shells, heretofore requiring discard by conventional reloading practice, could be reconditioned and reformed and then reloaded for further use.

The primary purpose of this invention therefore is to provide a method and an apparatus whereby the reconditioning of used shotgun shells and the reloading of the same for subsequent re-use may be greatly facilitated; and whereby a shell which is still leak-proof, but in any condition of deformation as picked up from the ground at a trap shoot may be completely restored and reloaded for efficient operation.

A further object of the invention is to provide an apparatus and method whereby the individual sportsman may repeatedly recondition and reload his used shotgun shells for repeated subsequent re-use.

A further very important object of this invention is to provide a method and a means for forming a more effective and stronger crimp on a shotgun shell whether new or reloaded, whereby a full 180° inturned bend will be secured at the top of the shell with the material of the shell forming the floor of the crimp and the retaining wall of the shot benig formed under the 180° crimp and directly against the inner wall of the shell to secure the maximum strength in the retention of the loading of the shell.

A further object of the invention is to provide an apparatus and a method whereby used shotgun shells may be reconditioned for effective re-use in an improved and greatly simplified manner and operation.

A further important object of the invention is to provide an apparatus and a method whereby used shotgun shells may be reloaded with great precision as to the quantity of the powder and charge therein and as to the dimensions of the reloaded shell.

To load an effective shell and obtain uniformity of results, there must be (1) accurate measurement of the charges of powder and shot; (2) uniform pressure upon both the powder and shot; and (3) equalization of confinement by the crimped end of the shell. The prime object of this invention is to meet these three requirements.

A still further and more specific object of the invention is to provide an apparatus and a method whereby the process of reconditioning and reloading a used shotgun shell may be performed in a convenient sequence of several operations to thereby reduce the labor and time required to effect the complete operation of reloading the shell while maintaining the precision of the quantity of powder and shot with which the shell is to be loaded as well as insuring that the dimensions of the reloaded shell shall be amply within the tolerances necessary for safe and effective use of the shell in a shotgun.

Another specific object of the invention is to provide an apparatus and method whereby the process and apparatus of reconditioning and reloading used shotgun shells shall include the steps of replacing optionally the battery cup and/or primer cap in a greatly simplified operation, thereby further reducing the time required and the cost for the preparation of a reconditioned and reloaded shotgun shell.

Another specific object of the invention is to provide an apparatus and a method whereby in the reconditioning and reloading of used shotgun shells the crimping operation by which the end of the shell is inturned upon and retains the charge of shot and powder in the shell shall be greatly improved to effect the highly satisfactory crmiping operation upon the shell.

Yet another object is to provide an apparatus and a method which is simple and foolproof in reforming the battery cup and thereby providing a firm seat for and properly seating the anvil thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a preferred embodiment of apparatus for carrying out the method in accordance with this invention;

FIGURES 2 and 3 are horizontal sectional detail views taken substantially upon the planes indicated by the section lines 2—2 and 3—3 respectively of FIGURE 1, but upon an enlarged scale;

FIGURES 4–23 are sectional views illustrating two methods of reconditioning and reloading used shotgun shells in accordance with this invention wherein:

FIGURE 4 is a fragmentary detail view in vertical section through a portion of the apparatus and showing the recapping anvil seater whereby a primer or battery cup is held in readiness for insertion into the base of the shell and showing a primer positioned therein;

FIGURE 5 is a detail view in vertical section illustrating the de-capping or depriming punch of the apparatus and its employment in removing a cap or battery cup from a shotgun shell, the tool being shown in position for removing a primer cap;

FIGURE 6 is a view similar to FIGURE 5 but showing the manner in which the de-capping punch has removed the cap from the shell;

FIGURES 7 and 8 are detail views in vertical section showing the manner in which the anvil of the battery cup assembly is re-set for receiving a new primer cap;

FIGURES 9 and 10 are views similar to FIGURE 7 but showing the manner in which the new primer cap is inserted in the shotgun shell;

FIGURE 11 is a fragmentary detail view in vertical section showing the manner in which the re-capped or re-primed shotgun shell is placed beneath the loading tube and receives a charge of powder therein;

FIGURE 12 is a detail view in vertical section illustrating the manner in which the packing wads are inserted into the shell upon the charge of powder previously placed therein;

FIGURE 13 is a view similar to FIGURE 12 but showing the completion of the applying of the wads to the shell;

FIGURE 14 is a view showing the shell again placed on the loading tube whereby the wads are packed upon the charge of powder witht he desired pressure and also showing the gauging action upon the powder and wads;

FIGURE 15 is a view similar to FIGURE 14 but showing the insertion of the charge of shot upon the packed wads by the loading tube;

FIGURE 16 is a detail view showing in vertical section the positioning of the shell, having the charges of powder and shot, inserted in a sizing die in preparation for the reforming of the shell base and the crimping operation;

FIGURE 17 is a view in vertical section showing the sizing die with the shell therein inserted in the crimping die;

FIGURE 18 is a view similar to FIGURE 17 but showing the first step of the crimping operation in which the shell is re-sized or reformed by the sizing die, the base of the shell is straightened or reconditioned, and the crimping operation at the upper end of the shell has been started;

FIGURE 19 is a view similar to FIGURE 18 but showing a further step in the crimping operation and in the use of the crimping die;

FIGURE 20 is a view in vertical section of the shell in the sizing die and the ejection plunger in readiness for completing the crimping operation and discharging the loaded shell from the sizing die;

FIGURE 21 is a view in vertical central section of the completed reloaded shell as discharged from the sizing die;

FIGURE 22 is a view similar to FIGURE 20 but showing as an alternative step in a method of reloading a shell the use of the loading tube for completing the crimping operation of the shell, with the same pressure as applied to the powder and wads;

FIGURE 23 is a view similar to FIGURE 22 but showing the completion of the crimping operation by use of the loading tubes;

Figure 28:
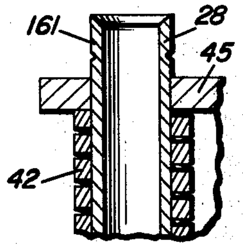
Figure 29:
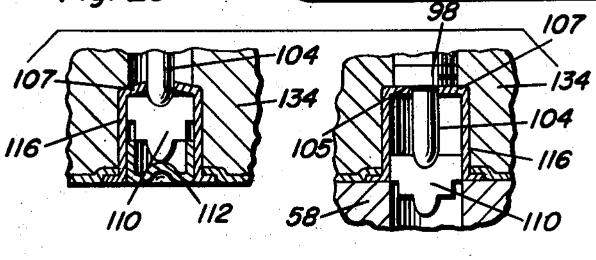
Figures 4, 5, 6:
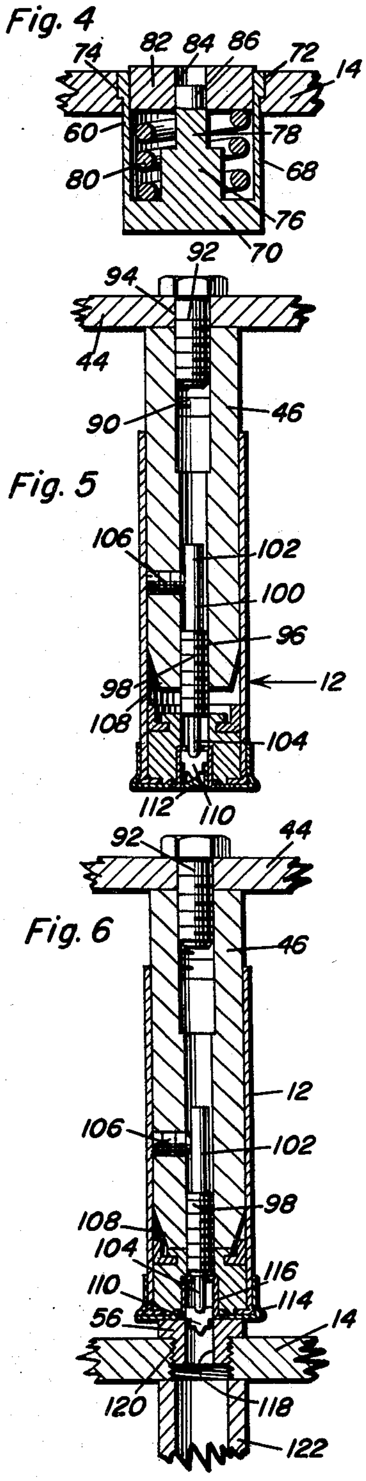
Figures 11, 12, 13, 14, 15, 16:
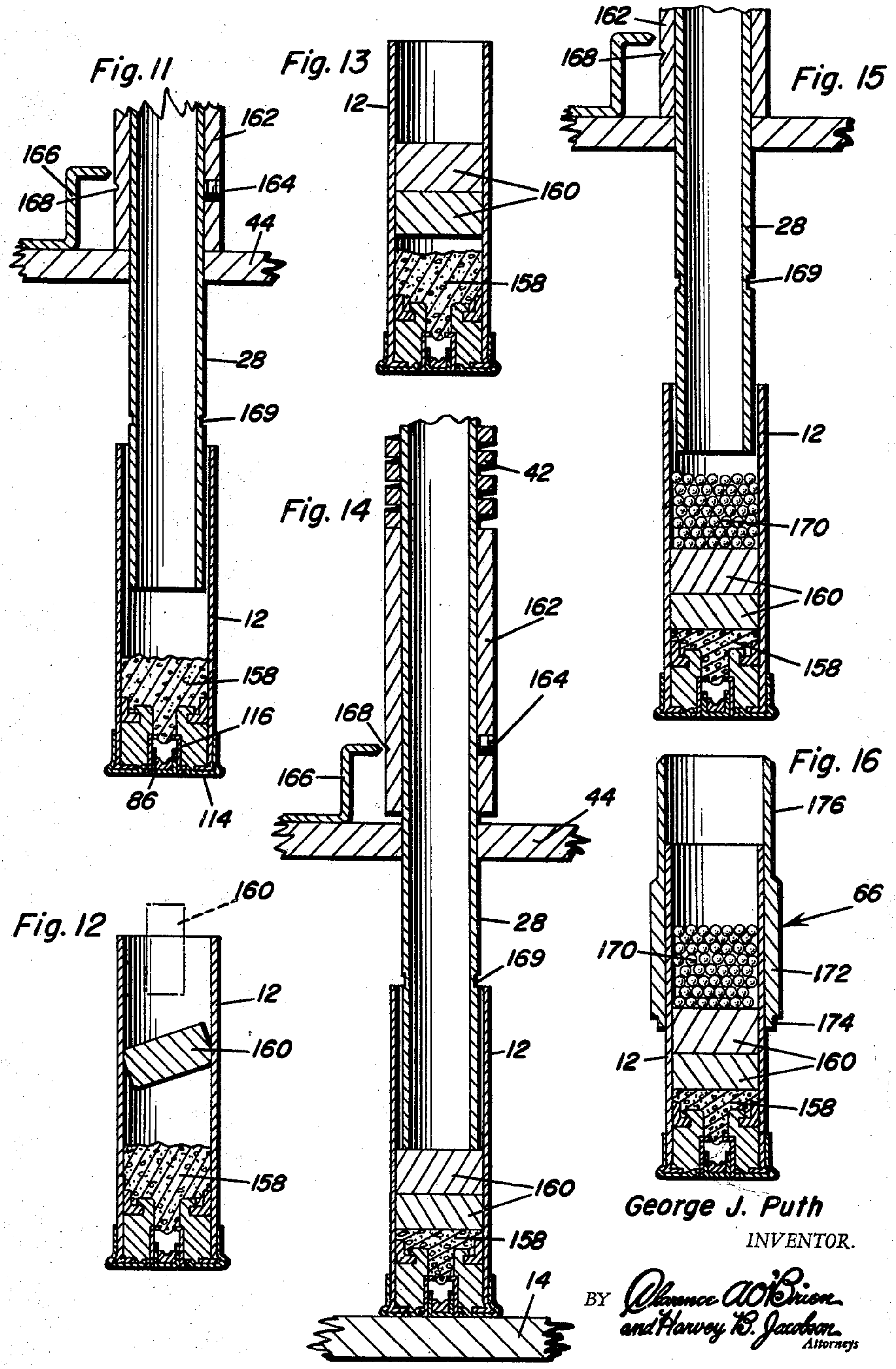
Figures 22, 23:
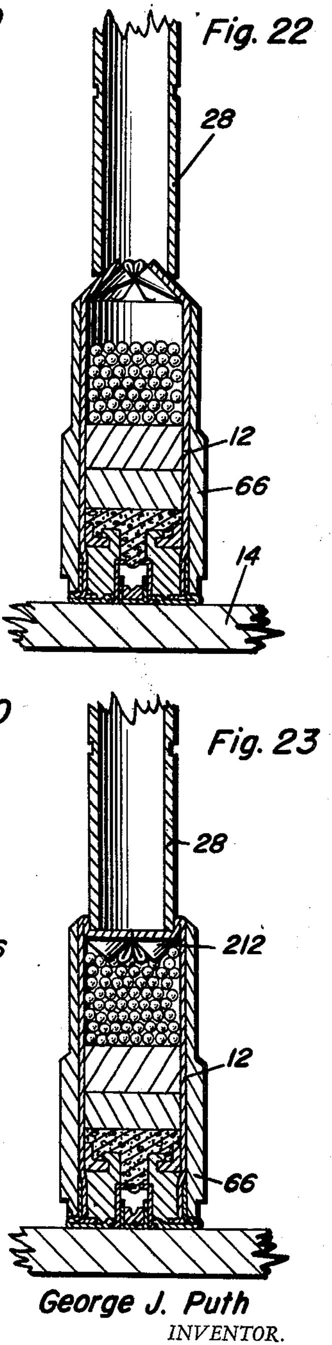

FIGURE 28 is a fragmentary sectional view of the upper portion of the loading tube and carriage and illustrating a gauging means for wad or powder pressure, at the same conditions of FIGURES 14 and 23; and FIGURE 29 is a detail view similar to FIGURES 5 and 6 but upon an exaggregated scale and illustrating the deformation of a fired battery cup and the manner of reforming the same by the use of the de-capping punch during the operation shown in FIGURES 5 and 6.

Shown in FIGURE 1 of the accompanying drawings is a suitable and preferred embodiment of apparatus in accordance with the principles of this invention and which is capable of reconditioning and reloading used shotgun shells in accordance with either of the two methods of this invention as set forth hereinafter and as claimed hereinafter. The apparatus which is designated generally by the numeral 10 is specifically designed to facilitate and with precision effect the reconditioning and the reloading of used shotgun shells which are designated generally by the numeral 12 throughout the attached drawings. Inasmuch as the specific structure of the complete apparatus 10 as to its basic features and general mode of operation is set forth and claimed in my copending application Serial No. 830,332, filed July 29, 1959, now Patent No. 3,009,389, which is a continuation-in-part of my prior copending application Serial No. 542,606, filed October 25, 1955, now abandoned, and as other structural features of the apparatus are disclosed and claimed in other of my co-pending applications, Serial No. 803,155, filed March 31, 1959, now abandoned, which is a continuation-in-part of my prior copending application Serial Nos. 596,038, now abandoned; 721,817, now abandoned; 719,814; and a detailed reference to the apparatus is accordingly deemed to be unnecessary in the present application in order to understand the subject matter of the invention claimed herein. Accordingly, only a general description of the apparatus will be given with sufficient structure and operation thereof being recited to afford an understanding of the subject matter claimed hereinafter.

Briefly, the apparatus includes a flat plate-like base 14 which may be suitably and reversibly carried by supporting legs 16 above a bench or other supporting surfaces as at 18 thereby affording mobility to the apparatus. Rising from and fixedly secured to the base 14 is a support post or support standard 20 upon which is fixedly but detachably mounted a pair of receptacles, hoppers or magazines 22 and 24 for the powder and shot respectively with which the shotgun shell is to be reloaded. Also carried by the support and cooperating with the lower end of the magazines or hoppers is a metering or measuring device 26 which is adapted to oscillate about a vertical axis of rotation and in alternation receive a charge of powder or shot from the containers 22 and 24 and deliver a measured charge to the upper end of a loading tube 28.

The details of the construction and operation of the measuring device 26 need not be here considered in order to understand the operation of the apparatus and the method claimed hereinafter. It is sufficient to state that the measuring device has two spaced measuring chambers, one for containing a measured charge of powder while the other will contain a measured charge of shot. The measuring device is shiftable between two extreme positions such that when the powder measuring chamber registers with the powder hopper and is being filled thereby, the shot measuring chamber is in registry with and is discharging into the upper end of the loading tube 28. When the measuring device is shifted to its other extreme position, the arrangement is reversed, with the powder chamber registering with and discharging into the loading tube and with the shot chamber registering with the shot hopper and receiving a charge of shot.

It will thus be evident that the device is foolproof in its operation, positively preventing the discharging of a second charge of either shot or powder until the first charge has been discharged in the loading tube. In other words, alternate charges of powder and shot are measured and discharged. The charges of either powder or shot fall by gravity from the magazine into the dispensing device, from the latter into the upper end of the loading tube; and from the open lower end of the latter into a shotgun shell into which the loading tube is disposed. The act therefore of measuring and delivering charges of powder and shot to the shotgun shell is rendered extremely simple and precise greatly facilitating the loading of the shotgun shells by the sportsman.

Also fixedly secured to the support post 20 is a mounting body or bracket 30 which is disposed in fixed position and has pivoted thereto as by a pivot pin 32 a hand operating lever 34. This lever is also pivoted as at 36 to a link 37 which is pivoted at 39 to a carriage or slide 38 guidably and slidably carried by the support post 20, this carriage or slide carrying various tools or elements employed in the method of reconditioning and reloading the shotgun shell as set forth hereinafter.

A compression spring 40 surrounds the support post 20 below the carriage 38 and yieldingly urges the carriage and the elements carried thereby into its uppermost position. The previously mentioned loading tube 28 is also mounted upon and is independently slidably carried by the carriage 38, being provided with a spring 42 surrounding the upper end of the loading tube and which yieldingly urges the loading tube downwardly with respect to the carriage to its lowermost position. The arrangement is such that the spring permits the loading tube to slide upwardly in the carriage when the predetermined force for which the spring is designed has been exceeded. Thus, when the loading tube is employed as set forth hereinafter as a means for applying pressure to the wads in the shell and thus to pack the powder charge therein; or to complete the crimping operation of the top of the shell after the latter has been loaded with powder and a charge of shot, a precise, exact and uniform pressure can thus be applied to the shell to effect the loading of the same inasmuch as the spring will yield when this pressure is exceeded. Thus, the operator of the apparatus is assured that when he depresses the lever 34 to thus apply downward force and travel to the carriage 38, as he does in sequence during the various steps of the loading operation of this apparatus as set forth hereinafter, he will not apply more than the desired predetermined force to the charges of powder and shot when effecting the loading of the shell.

Figure 2:
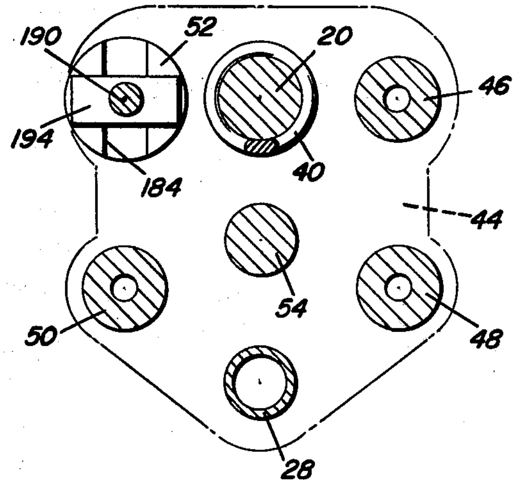

The carriage 38 includes a flat horizontally extending bottom member or plate 44 to which and about which are secured a plurality of elements which are utilized to perform the various steps of this method. The carriage also has fixed thereon an upper horizontal plate 45, see FIGURE 28, through which the upper end of the loading tube extends and is slidably guided. Referring now particularly to FIGURE 2 the location of this plate 44 of the carriage 38 with respect to support post 20 and the carriage support spring 40 will now be readily apparent.

At this time it should be noted that the order or the arrangement in which the various elements of this apparatus are positioned upon the carriage plate 44 can be varied or reversed depending upon whether the operator of the apparatus is right-handed or left-handed. For this purpose, the base 14 is disconnected from its support legs 16 and the elements mounted upon it, is turned over or reversed and again is secured to the legs and elements. This reversibility of the implements in their mounting upon the carriage plate 44 and the base 14 renders this apparatus equally adaptable for use with right-handed or left-handed operators, it being understood that the implements will be placed in sequence in the order in which their use is required in the method of loading a shell in accordance with this invention. In one convenient arrangement, the position of the de-capping punch is shown at 46, at the next station as indicated at 48 is the anvil straightening and seating punch, employed to re-seat the anvil after the primer has been ejected by the de-capping punch 46, in readiness for insertion of a new primer into the shell. In the next position on the carriage plate 44 is the previously mentioned loading tube 28 and adjacent thereto is a re-capping punch 50.

In the final position is the sizing cap or two-stage crimping die 52. Disposed centrally of the plate is the ejecting punch 54 by means of which the final step of the crimping operation is completed and the re-loaded shell is ejected from the sizing die 66.

Figure 1:
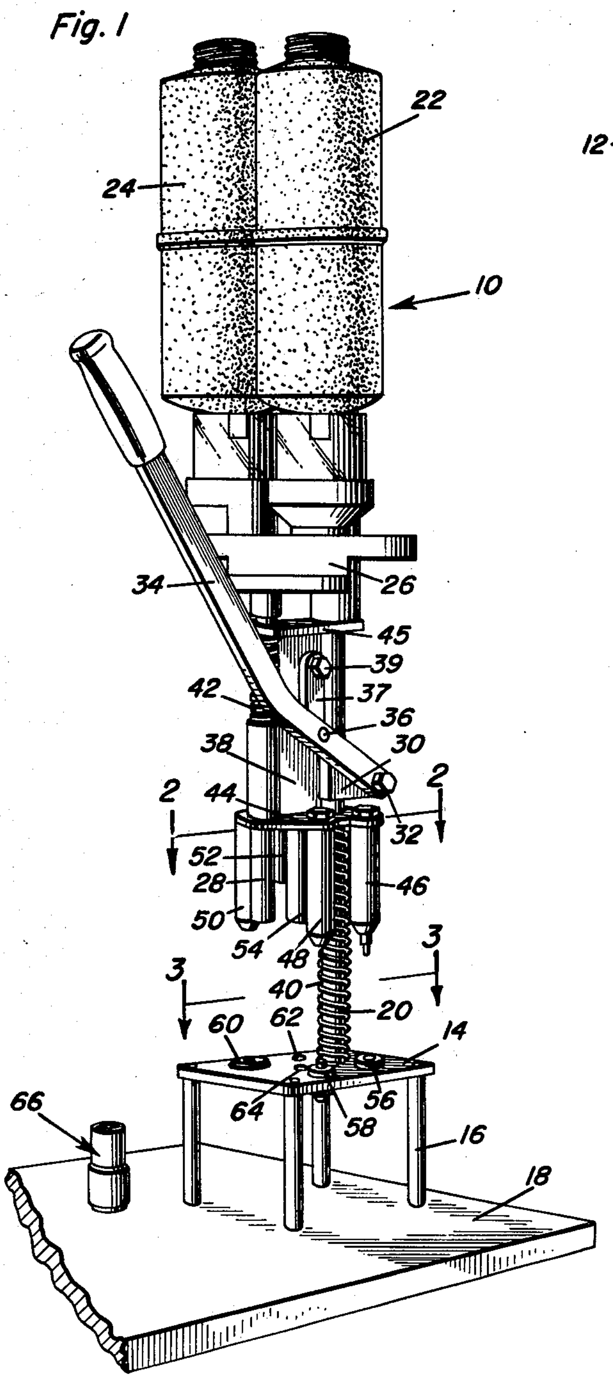
Figure 3:
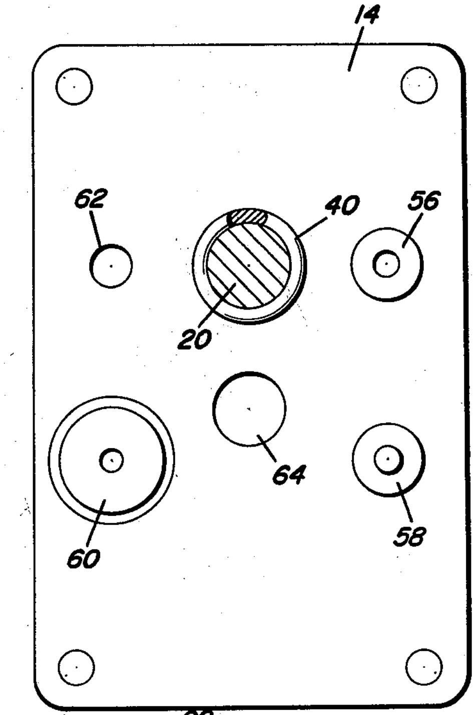

Referring now to FIGURE 3 in connection with FIGURE 1 it will be observed that the base 14 also has a series of detachable implements mounted thereon which cooperate with various of the implements carried by and depending from the carriage plate 44. Thus, disposed directly beneath the de-capping punch 46 is the cap punching die 56 which supports the base of the shotgun shell as the cap is punched therefrom by the de-capping punch. When removing a battery cup primer, the die 56 is removed and the aperture in the base plate permits the battery cup primer to be punched from the base of the shell. Either primer or cup is discharged below the base plate 14 into a suitable receptacle which may be provided for that purpose.

Next in order on the base plate and disposed below and in vertical alignment with the anvil straightening and seating punch 48 is the anvil seating die 58. This supports the shotgun shell as the anvil of the battery cup is repositioned in its base by the anvil straightening and seating punch 48, in readiness for the insertion of a new primer.

Next in order, and disposed below and in vertical alignment with the re-capping punch 50 is the primer seating assembly 60 or a battery cap seating assembly. This assembly serves to hold a primer or battery cup unit and facilitates their insertion into the battery cup or the base respectively of the shotgun shell during the repriming or re-capping operation thereon.

Interchangeable assemblies are employed to selectively insert the entire battery cup or a primer cap thereof as desired. The reference hereinafter in this specification to the primer seating assembly 60 is intended to apply to both of the interchangeable assemblies.

It will be observed that there is provided a further aperture 62 which is disposed substantially opposite the cap punching die 56 previously mentioned. The purpose of the aperture is to permit the cap punching die to be placed on either side of the machine in order to facilitate its use by either a right-handed or left-handed operator, and also serves to relieve any pressure which may be exerted upon the cup or battery cup primer when the two stage crimping die 52, disposed directly thereover, is operated.

It will be observed that there is also provided through the base and directly below the ejecting punch 54 an ejecting aperture 64. This aperture is of sufficient size to support and hold the sizing die 66, shown in use in FIGURE 20 and not in use in FIGURE 1, so that the ejecting punch 54 when descending with the carriage may complete the crimping operation and then force the completed shell through the open bottom end of the die and through the aperture 64 in the base.

The operation of this apparatus, and its specific functions of the structural details of the various elements thereof will now be more readily understood and will be explained in connection with the description of the method of the operation of re-loading a used shotgun shell in accordance with the invention.

*Method of Reconditioning and Reloading Used Shotgun Shells*

Conventional shotgun shells are physically capable of being reloaded and fired as many as 20 to 30 times. However, after a shell has been fired, it is necessary to replace either the battery cup unit or the primer cap thereof. Moreover, there is usually some distortion of the wall of the shell and likewise of the brass portion thereof. Therefore, in order to effectively reload a shell for re-use it is necessary to recondition the shell by restoring the same to a smooth cylindrical contour of its wall and to flatten and straighten the brass base portion which may have been deformed for a number of different reasons.

All of these operations are automatically effected by the apparatus of this invention and during the method of reloading shotgun shells in accordance with this invention.

The steps in the method of reconditioning and reloading a shell are now set forth in FIGURES 4–23.

The first step in the reloading of a shotgun shell in accordance with this method is to place a battery cup or a primer cap in the primer seating assembly 60 in readiness for insertion into the base of the cartridge. Referring to FIGURE 4 it will be observed that the primer seating assembly 60 includes a cylindrical steel cup 68 with a thickened closed bottom wall 70 and having an annular enlarged flange 72 at its upper end which is received in a shouldered aperture 74 in the base plate 14. Rising from the bottom wall 70 is a centrally disposed cylindrical body 76 from which in turn arises a diametrically reduced cylindrical anvil 78. A coil spring 80 is received within the cup 68, being seated and retained in position by the body 76, and surrounding the latter and the lower portion of the anvil 78. A flat annular disk or washer or plate 82 is slidably received in the open upper end of the cup 68, resting upon the compression spring 80. This washer has a centrally disposed well or bore 84 therethrough of a sufficient size to slidably embrace the anvil 78, the bore and anvil in turn being of the proper size to cooperate with either a primer cap 86 or a battery cup unit.

When it is intended to replace the primers and recondition the battery cup for re-use, a different assembly 60 will be employed from that required when the device is to replace the entire battery cup. For this purpose, a pair of assemblies 60 having different sized apertures 84 therein and different size anvils 78 will be interchangeably insereted in the base opening 74 and will cooperate with either cap or primer unit.

The first step in the method of operation therefore consists in placing a primer 86 in the well 84 of the primer seating assembly 60, the completion of this first step being shown in FIGURE 4.

The second step in the method consists in placing a used shotgun shell 12 upon the lower end portion of the de-capping punch or plunger 46. This step will be understood together with the ensuing portion of the operation from a consideration of FIGURES 5 and 6.

As shown in FIGURES 5 and 6, the de-capping punch 46 consists of a hollow tube having an internally threaded bore 90 in its upper end to receive a fastening bolt 92 extending through an aperture 94 in the carriage plate 44 wherein the punch is detachably secured to the underside of the carriage plate. The lower end of the bore is internally threaded as at 96 for the reception of the externally threaded middle portion 98 of a de-capping punch pin 100. This pin is reversible, having one end at 102 diametrically enlarged and of a sufficient size for punching out the battery cup unit, while its other end 104 is diametrically reduced and of sufficient size to punch out the primer of a battery cup unit. This pin is therefore reversible and is reversed in the end of the de-capping punch 46 at the same time that the assembly 60 is interchanged as previously mentioned in order that the device may be selectively operated to remove the spent battery cup unit or the primer cap thereof. As shown in FIGURE 5, the tool is in position to punch out the primer cap.

A setscrew 106 serves to retain the de-capping punch pin 100 in properly adjusted position in the de-capping punch.

The placing of the shell upon the lower end of the de-capping punch 46 by hand and the holding of the shell thereon is a completion of the second step of the method of this invention. It will be noted that the lower end portion of this punch has a tapered end portion 108 to facilitate its passage into the open end of the shell, even though the latter may be partially collapsed and deformed from prior usage. This diameter may be increased or reduced as different manufacturers vary shells at this dimension.

The views in FIGURES 5 and 29 illustrate the shell applied to the de-capping punch, and with the de-capping punch pin portion 104 entering the base of the shell and into the top wall of the battery cup unit, and engaging the end of the primer anvil 110 in readiness to press against the same and cause the latter to effect the spent primer 112 downwardly out of the base of the shell.

The third step of this method consists in manually depressing the actuating lever 34, thereby causing the carriage 38 to move downwardly upon the support column or standard 20 against the resistance of the support spring 40, thereby forcing the shell which encircles the lower end of the de-capping punch 46 against the cap punching die 56. Since the brass base 114 of the shell 12 is held against the bushing 56 which comprises the cap punching die, see FIGURE 6, the shell base is thereby supported and further downwardly movement of the punching pin 104 against the anvil 110 causes the latter to drive the spent primer cap 112 out of the shell base 114 and out of the battery cup 116 which is frictionally received therein, the spent primer cap dropping through the bore 118 in the bushing 56, through the externally threaded aperture 120 in the base plate 14 into a tube 122 or other collecting means for receiving the ejected primer caps. The pressure of the plunger 46 against the top of the base wad 134 re-seats the latter against the base of the shell, from which it is sometimes loosened in the act of firing. It also, by the shoulder 105 on the pin 104, see FIGURE 29, engages the lip 107 of the battery cup, which may have been deformed during firing, and restores it to a square shoulder against which the anvil 110 is securely and properly seated, as shown in the view at the right of FIGURE 29.

Figures 7, 8:
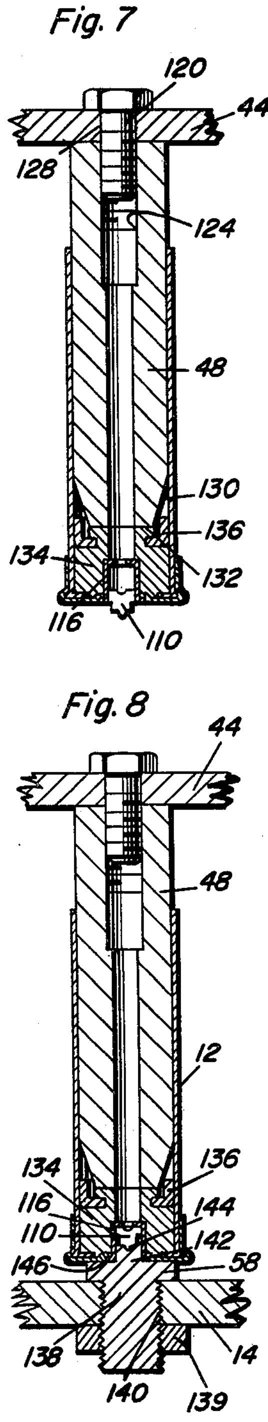

The fourth step in the method is to reset the anvil 110 which was displaced in the performance of step number three in which the spent primer was ejected from the battery cup. For this purpose, as shown in FIGURE 7, the shell is placed upon the lower end of the anvil straightening and seating punch 48. The latter is of similar construction to the de-capping punch 46 in that it consists of a hollow steel tube having an internally threaded bore 124 in the upper end thereof for reception of a fastening bolt 126 extending through an aperture 128 in the carriage plate 44 by which the de-capping punch is detachably secured to this plate. The lower end of the punch 48 has a variable diameter tapered nose portion as at 130, which, as shown in FIGURE 7, terminates in a flat lower surface 132 which abuts against the top surface of the base wad 134 and tightens the clamping action of the same upon the sealing cup 136 in the base of the shell as above mentioned. When the lever 34 is again pulled down, the plunger 48 carries the shell down upon the anvil die 58 therebeneath, which die is in the form of an externally threaded plug 138 having a flat top surface and which is received in the internally threaded bore 140 in the base plate 14 and having a lock nut 139 thereon. Rising from the die is a stem 142 recessed at 144 to conform to the shape of and to receive the lower end of the anvil 110. Surrounding the upstanding stem portion 142, the die 58 has an annular flat surface 146.

Figures 9, 10:
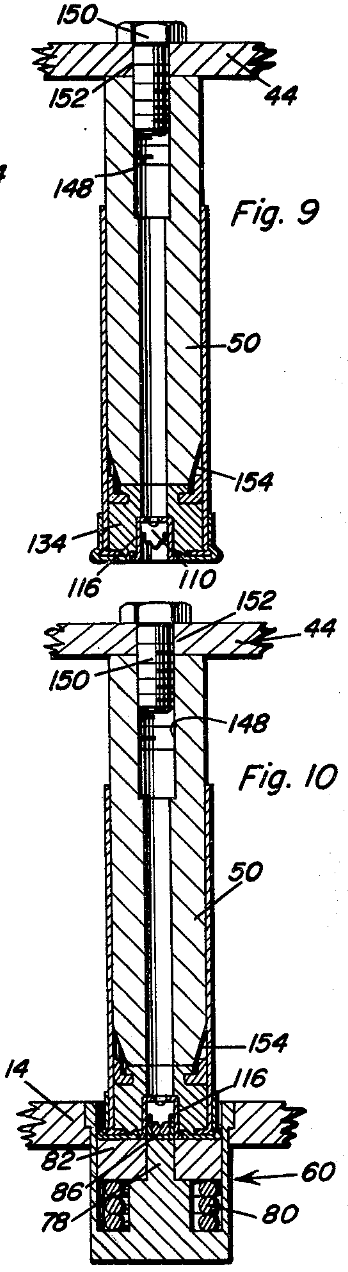

The function of these parts as shown in FIGURE 8 is to cause the downward travel of the shell with the upper travel of the stem 142 inside the battery cup 116 to engage the anvil 110 and force the latter upwardly in the battery cup into proper position, centered with respect thereto and seated squarely upon the lip 107 of the cup, straightened as shown in FIGURE 29, in readiness to receive the next primer cap. This position of the anvil as seated is shown in FIGURE 9. During this downward travel of the plunger 48 and the shell carried thereon, it will be observed that the base of the shell will engage upon the flat annular surface 146 of the die 58 and under a downward pressure imparted to the shell by the tool, the base will be flattened out and re-shaped to some extent.

The member 138 being vertically adjustable upon the plate 14 acts as a stop which is engageable by the punch 48, thereby adjustably limiting the stroke of the punch 48 in reforming the battery cup as shown in FIGURE 29. The adjustment is necessary because battery caps are variable in length.

The next and fifth step in this method is to remove the shell with its anvil centered as in FIGURE 9 from the plunger 48 and place it upon the re-capping punch 50, as shown in FIGURE 10. This plunger is likewise of the same construction as the plungers 46 and 48 previously mentioned, consisting of a hollow steel tube having an internally threaded bore 148 in its upper end receiving a bolt 150 extending through the aperture 152 in the carriage plate 44 whereby this punch is detachably secured to the underside of the carriage plate. The lower end of this plunger has a tapered nose 154 in conformity with that of the plunger 48 previously mentioned.

The sixth step is performed, FIGURE 10, as the lever 34 is now pulled downward causing the plunger 50 to carry the shell downwardly upon the primer seating assembly 60 previously mentioned and which was previously described in connection with FIGURE 4. As the shell moves downwardly, the flat base of the shell will rest upon the disk or washer 82 depressing the latter against the spring 80. This in turn will cause the anvil 78 to move upwardly into the empty battery cup 116 of the shell, thereby lifting a replacement primer 86 into the battery cup and will force the conversion or replacement primer up upon the previously seated anvil 110. FIGURE 10 shows the completion of the step of inserting the primer into the battery cup.

The seventh step of this method commences the actual loading of the shell. For this step, the shell with the primer cap inserted is removed from the re-capping punch 50 and, as shown in FIGURE 11, is then placed about and under the lower end of the loading tube 28 as shown in FIGURE 11. While the shell is manually held in place the metering or measuring device 26 is actuated to one side and a measured charge of powder as at 158 is then dropped into the shell, the operation of the measuring device comprising the seventh step in this method, and being shown completed in FIGURE 11.

The eighth step in the method, as shown in FIGURES 12 and 13 consists in the introduction of the powder wads 160 into the shell and above the powder charge 158. These wads may be conveniently inserted by introducing the same into the open upper end of the shell as shown in dotted lines in FIGURE 12, then turning the wad sidewise pushing it down as shown in full lines therein. The two wads are then pushed down by fingers upon or in close proximity to the powder charge 158 or into the position shown in FIGURE 13.

At this point it should be understood that it is customary to employ two wads for this purpose. In some instances, however, other numbers of wads can be employed. The important condition is that a sufficient thickness of wad shall be inserted so that the combined overall height of the powder charge, wads and the charge of shot shall extend to a fixed predetermined height within the shell for a particular type of shell. Conveniently, the lower wad may consist of No. 135 card wad, while the other wad may comprise a ⅜ inch fiber wad. Since shells vary in depth and wads vary in thickness, no fixed dimension can be given for this other than the combined height of the power and wad column. This distance is gauged as at 169, FIGURE 14, as set forth hereinafter.

The ninth step, of this method, illustrated in FIGURE 14 consists in again placing the shell upon the lower end of the loading tube and then depressing the lever 34 to cause the loading tube to function as a tamper for applying a predetermined force or pressure to the wads and to the powder charge therebeneath.

At this point, referring particularly to FIGURES 14 and 28, it should be observed that above the carriage plate 44 and below the plate 45 the loading tube has fixedly secured thereto and is encircled by a sleeve 162, secured by a setscrew 164, by which the lower end of the loading spring 42 exerts its thrust through the sleeve 162 to the loading tube 28. The downward thrust of the lever 34 upon the carriage 38 is transmitted by the carriage plate 45 to the upper end of the spring 42 and through the latter by pressure upon the sleeve 162 exerts a downward thrust upon the loading tube 28. Thus, for a given spring 42 there will be a given thrust possible upon the loading tube 28. This arrangement therefore insures that the wads 160 and a powder charge 158 will have always the same force applied thereto regardless of the thickness of the wads, the quantity of powder employed or the different type of shells to be loaded. Usually, the spring 42 is constructed for imparting a thrust of 75 lbs. This is the pressure usually employed for packing the powder charges of shells in this country. Springs of different strength will be interchanged to obtain different packing pressures.

Attention is directed to the indicia or gauge member 166 shown in FIGURES 11 and 14. There is a cooperating indicia mark 168 on the side of the sleeve 162 adjacent thereto which is so disposed that when the proper thickness of wad is employed for the usual charge of powder, there will be a definite indication that the desired pressure has been applied to the powder and wad column inside the shell. For convenience, an additional indicator such as the groove 161, FIGURE 28, on the upper end of the tube 28 will show above the plate 45 when the spring 42 is compressed by upward travel of the tube in the slide.

There is provided an indicator in the form of a groove 169 on the loading tube which registers with the top of the shell when the correct combination length of power charge and wad after correct pressure has been applied. This has no relation to the pressure which should be applied to the powder and wads. If the correct amount of powder and the correct wads have been properly inserted with proper pressure, the top of the shell will register with the bottom edge of the groove 169 in FIGURE 14, for example, with a 12 gauge shell, 1⅛ ounces of shot. The groove is of such width that with 1¼ ounces of shot, the top edge of the groove 169 will register with the top of the shell. A groove .005 inch deep and $\frac{1}{16}$ inch wide is satisfactory.

The groove 161 also functions as a guide in assembling the loading tube when the groove 161 registers with the upper surface of plate 45, FIGURE 28, setscrew hole 164 of FIGURE 14 is in proper position to lock the loading tube 28 to the sleeve.

The tenth step of this method is to again operate the metering and measuring device 26 but in the other direction and thereby drop by gravity a measured charge of shot 170 as shown in FIGURE 15, into the shell 12 and above the now properly compacted charge 158 and wads 160.

The eleventh step, shown in FIGURE 16 consists in removing the shell with its charges of shot and powder from the loading tube 28 and inserting the shell into an open lower end of the sizing die 66 previously mentioned. The structural details and proportions of the sizing die are shown in FIGURES 16–20, and 22 and together with their functions are referred to in connection with these figures. Briefly, the sizing die consists of a steel tube having a diametrically enlarged body portion 172 with a diametrically reduced shoulder portion 174 at its lower end. Above its mid-portion, the die has an upstanding cylindrical portion 176.

The central bore or passage through the die is tapering, or outwardly flaring at its lower end to facilitate entry of the open upper end of the shell 12 thereinto. From its open lower end, the die has its bore of a diametrically reduced tapering configuration in order that when the die is forced downwardly upon the shell it will tend to constrict and compress the lower portion of the shell, and embrace and prevent possible distortion of the lower end of the shell during the succeeding operations in this method.

Figures 17, 18, 19, 20, 21:
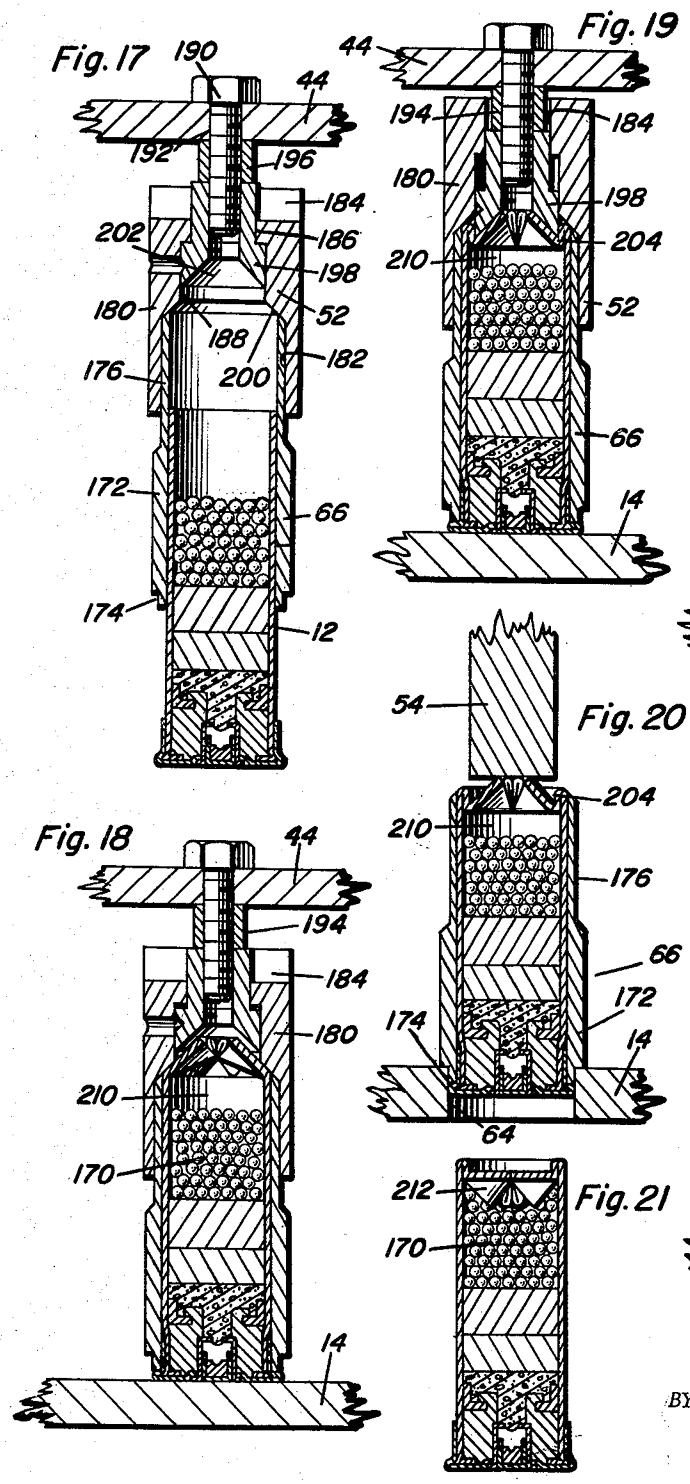

The twelfth step in this method consists in inserting the upper end of the sizing die with the shell received in the lower end thereof into the open bottom of the two-stage crimping die 52. This position is shown in FIGURE 17. The crimping die assembly 52 consists of a cylindrical body 180 having a diametrical bore 182 in its lower end receiving the upper end 176 of the sizing die as shown in FIGURE 17. Extending diametrically across the top of the body 180 is a slot 184, which will be best seen by comparing FIGURE 19 with FIGURES 17 and 18. A diametrically reduced bore 186 opens into the slot, and a further bore 188 connects the bore 182 with the bore 186. A fastener 190 extending through an aperture 192 in the carriage plate 44 receives thereon a spacer bar 194, see also FIGURE 2, and carries at its lower end the stem 196 having a laterally enlarged head 198 which is slidably received within the middle bore 188. The arrangement is such that when the spacer 194 which is in the form of a bar is disposed transverse the slot 184, the upper surface of the body 180 will bear against the same in the position shown in FIGURES 17 and 18.

In this twelfth step of the method the die body 180 is turned so that the spacer bar 194 extends transversely across the slot 184, this being the position shown in FIGURES 17 and 2.

In the next or thirteenth step of this method the handle 34 is depressed thereby lowering the carrier plate 44, the crimping die, the sizing die and the shell carried thereby until the base of the shell strikes against the base plate 14. Further downward movement of the carriage and of the crimping die forces the upstanding portion 176 of the sizing die upwardly into the crimping die 52 all the way to the top of the bore 182 therein, this being the position shown in FIGURES 17 and 18, and with the top surface of the body 180 abutting the spacer bar 194. During the upward travel of shell 12 in the sizing die, the shell is completely forced into the sizing die as will be apparent from FIGURE 18 and the upper end of the shell now projecting above the upper end of the sizing die will abut against the conical surface 200 of the crimping die which joins the bores 182 and 188, thereby performing the initial portion of the crimping operation on the upper end of the shell. This step of the method is completed when, as shown in FIGURE 18, the shell has been forced completely into the sizing die, the upper portion of the shell being inturned upon itself to form a conical nose for the shell, and initiating the crimping operation on the upper end of the shell. During the operating of the two-stage crimping die, the previously mentioned aperture 62 in the base plate, see FIGURES 2 and 3, provides a clearance below the primer in the base of the shell, preventing any application of pressure to the primer cap.

It will be observed that the lower surface of the headed portion 198 of the stem 196 likewise has a conical recess 202 therein which in this position of the die body 180 provides a clearance to receive the coned upper end of the shell.

At the same time that this operation has initiated the crimping of the upper end of the shell, the pressure of the base of the shell against the base plate 14 has completed the shaping and flattening of the base, which was started by the de-capping punch 46 as mentioned in step 3 hereinafter. It will be observed that the lower portion of the sizing die somewhat reduces the diameter of the lower portion of the shell by its compressive engagement and at the same time engages the rim of the brass base of the shell and thus presses the shell base into a flat plane condition. At this time the shaping of the shell has been completed, simultaneously with the completion of the initial portion of the crimping operation.

For the fourteenth step in this method, the pressure upon the handle 34 is slightly released and the die body 180 with the sizing die and the shell therein is then turned until the slot 184 is caused to align with and receive the spacing bar 194 therein. This registering position is shown in FIGURE 19.

The fifteenth step of the method consists in again depressing solidly the handle 34. This causes the die body 180 to move upwardly with the spacing bar 194 being now received within the slot 184. This in turn causes relative downwardly movement of the headed portion 198 with its conical surface 202, thereby forcing the central portion of the crimped nose of the shell downwardly into the shell. This operation, as shown in FIGURE 19, forms an inturned fold 204 at the junction of the conical crimped nose of the shell with the uncrimped side wall thereof, and also completes the gathering of the nose portion of the shell, folding it in upon itself as shown in FIGURES 19 and 20. At this time, the entire surface of the nose of the shell is now received in the recess 202 of the headed portion 198.

The top of the crimp center at this time will be at an upward angle of about 30 degrees as will be readily apparent from FIGURES 19 and 20.

The sixteenth step in the method now consists in releasing the handle 34, removing the partially crimped shell still in its sizing die from the crimping die and placing the sizing die under the ejecting punch 54 as in FIGURE 20, with the previously mentioned shoulder portion 174 of the sizing die received and seated in the apertures 64 in the base plate 14. As will be observed, the base of the shell is disposed within the aperture 64 in readiness for downwardly ejection of the shell from the sizing die and through the base plate.

The next and seventeenth step of the operation and the final step of the method in one form of this invention consists in lightly lowering the ejection plunger into contact with the crimped top of the shell and then imparting a sharp sudden blow to the handle 34, thereby causing ejection plunger 54 to move slightly into the sizing die and the upper end of the shell therein thereby flattening the partially crimped upper portion to cause the latter to move downwardly into a flat planar condition as shown in FIGURE 21. It will be observed that in this condition the folds forming the crimp in the nose of the shell are now forced downwardly into the charge of shot therein. It should be particularly observed that as shown in FIGURES 18–20 there is a clearance or space as at 210 between the topmost surface of the charge 170 and the bottom surface of the crimped portion at the nose of the shell. However, when the crimped nose is forced downwardly to a flat condition as shown in FIGURE 21, the folds 212 of the crimped portion is forced downwardly into the charge shot 170, thereby closing in the shot without further compressing the wads or powder.

Simultaneously with or immediately subsequent to the flattening of the nose portion into the smooth crimped condition of FIGURE 21, the sharp blow or thrust applied to the crimped portion during the flattening operation will drive the completed shell downwardly out of the sizing die and through the ejection aperture 64 into the space below the base plate 14. This completes the loading operation of a shell in accordance with one method of this invention.

A second method of the invention is the same as that previously described through the completion of the operations and steps up to those shown in FIGURE 19. However, in place of the steps shown in FIGURE 20, after the completion of the partial crimping operation, the sizing die and the shell are removed from the crimping die of FIGURE 19 and are then placed beneath the loading tube 28 as shown in FIGURE 22. In this position the open lower end of the loading tube will embrace the upper portion of the conical nose of the partially crimped shell as shown in FIGURE 22. Thereupon, when the handle 34 is moved manually downward, the lower end of the loading tube will apply pressure to the partially crimped nose portion of the shell, forcing the latter inwardly and completing the crimp as shown in FIGURE 23. However, it should be noted that in this operation the maximum force which can be applied to the crimp for the completing of the same is no greater than that permitted by the loading tube spring 42, and thus with this latter method of loading the contents of the shell will at no time be subjected to a force greater than that of the loading spring 42 or about 75 lbs. The latter operation is recommended only for skilled operators as the success or failure depends primarily upon the proficiency of the operator.

Next, the crimped shell still in the sizing die is removed from the loading tube, is placed over the ejection aperture 64 as in FIGURE 20 and is then ejected from the sizing die and through the ejection opening by the ejection plunger 54 as previously mentioned.

By this method, absolute uniform pressure is secured upon the crimp and wad column and with the same gauge 166, 168 or the gauge members 161, 45 which were employed for applying these pressures to the powder during the loading of the shell.

Figure 24:
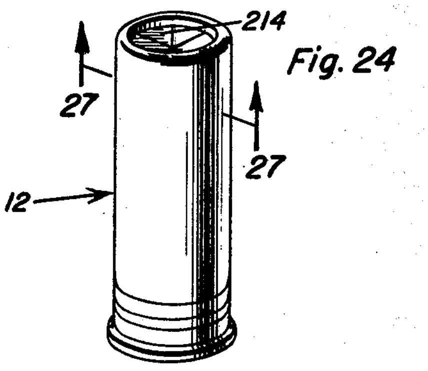
FIGURE 24 is a perspective view of the completely reloaded shell whether formed by the use of the crimping plunger of FIGURE 20 or the loading tube as in FIGURES 22 and 23.
Figure 25:
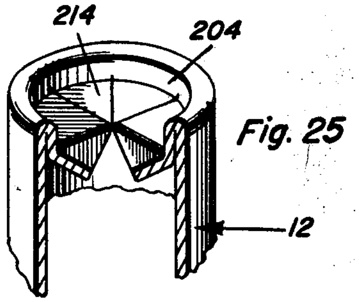
FIGURE 25 is a detail view in perspective, parts being broken away, at the upper portion of the shell of FIGURE 24 and showing the details of structure of the crimp formed therein.
Figure 26:
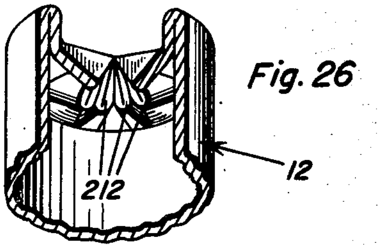
FIGURE 26 is a view similar to FIGURE 25 but showing further details of the crimped construction of the shell.
Figure 27:
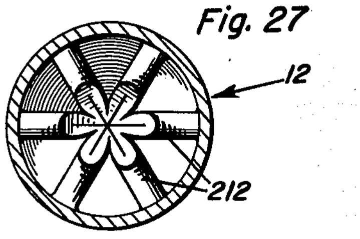
FIGURE 27 is a horizontal sectional view taken substantially upon the plane indicated by section line 27—27 of FIGURE 24 and showing the crimp from the underside thereof.

In order to more clearly understand the actual steps which occur in the material forming the upper or nose portion of the shell during the crimping operation, attention is also directed to FIGURES 25–27 in conjunction with FIGURES 24. In FIGURE 24, the complete shell 12 is shown. The inturned fold of the upper end of the shell where the upper end is folded inwardly to form the crimped portion is shown at 204. As the upper end is crimped, as shown in FIGURE 26, the material thereof has formed therein a plurality of radially extending downwardly directed loops or folds as at 212 in FIGURE 26, or in FIGURES 21 and 24. These downwardly extending folds 212 are in the form of radial ribs which project downwardly into the previously mentioned space 210 and into the charge of shot 170 therebeneath. When the crimping operation is completed, there is a flat circular disk as at 214 completely closing the interior of the shell at its upper end and extending across the shell from the lower portion of the inturned lip 204. Although it would appear from FIGURE 25 that the radial lines seen in FIGURES 24 and 25 are slits in this disk, this is an optical illusion arising from the fact that the tight pressed folds of the loops 212 appear as radial lines and that there is one of the radial webs or folds 212 for each line. Consequently, the charge is retained within the shell by a flat circular disk 214 imperforate except for the center at which the folds meet.

In the process of folding or crimping the upper end of the shell to form a flat retaining wall for the shot, the crimp segments 214 as shown in FIGURES 20 or 22 extend upwardly at an angle of 30° to the horizontal and are approximately .030 inch longer than one-half the internal diameter of the shell, the shell wall being of paper .030 inch thick. When the upper end of the shell is folded in to provide the fold or lip 204, the inside diameter of the latter is therefore .060 inch less than that of the inner shell diameter below the crimp. The combined length of the segments 214 of the crimp are .060 inch greater than the inside diameter of the fold 204. Consequently, in the final action of the plungers 54 or 28 in flattening out the 30° taper of the crimp forces the junction of the segments 214 with the crimp 204 back under the latter and directly against the inside wall of the shell thereby holding the crimp 204 in a full 180° bend and locking the perimeter of the flat segment under this bend. The maximum security and strength is thus realized for the crimp.

It is extremely important to obtain a known pressure on the powder charge of a shell in order to obtain accurate results in shooting by marksmen. For example, an increase from 75 lbs. to 95 lbs. in the pressure on the powder will increase the shot speed of the discharged shell about 300 feet per second. When the marksman is thus leading a moving target, he must make proper allowance for this increase in velocity of the shot for accurate shooting.

The present invention provides both an apparatus and a method whereby the individual sportsman can repeatedly reload his own used shotgun shells thereby greatly decreasing the cost of his ammunition. More important, however, he can obtain a uniformity of performance of the shells which will greatly exceed the uniformity of performance of the shells as originally purchased from the factory. This advantage is obtained by virtue of the fact that the loader reforms the used shells to a higher degree of precision and secures a more uniform quantity of the powder and shot and a more uniform compaction of the same than is customarily found in factory loaded shells. Further, by this apparatus and method the diameter of the reloaded shell is brought to as small as or even slightly smaller than the original factory dimensions, thereby rendering it certain that the reloaded shell will have no difficulty in being inserted into the breech of a gun.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A shotgun shell loading device having a base, a stand rising therefrom, and a carriage mounted on said stand for vertical movement toward and away from said base, a shotgun shell, a sizing die encircling said shell, said sizing die being cylindrical in shape and having a tapered bore formed vertically therethrough, said shell having a base adapted to be seated on said device base with a flange projecting peripherally from the lower end thereof, the lower edge of said sizing die being in engagement with the base flange of said shell, a sizing cap mounted on the carriage and of cylindrical shape and having a blind tapered bore formed therein to accommodate the upper portion of said shell, a counterbore in said sizing cap communicating with said sizing cap tapering bore and formed for receiving the upper portion of said sizing die whereby upon relative movement of said sizing cap toward said shell the lower edge of said sizing die will apply pressure to said shell base flange.

2. In a shotgun shell loading device for use in reshaping used, deformed, charged shells having lower portions with dished, circular bottoms and circular flanges projecting upwardly therefrom and inwardly from the circular peripheral edges thereof, a shell sizing assembly comprising a sizing die, a cap engaged therewith and having said sizing die telescoped therein, said sizing die being cylindrical in shape and having a tapered bore formed vertically therethrough for accommodating the shell therein, said cap being cylindrical in shape and having a bore formed therein of sufficient dimensions to telescopically receive the upper portion of the sizing die and the upper portion of the shell.

3. In a shotgun shell loading device for use in reshaping used, deformed, charged shells having lower portions with dished, circular bottoms and circular flanges projecting upwardly therefrom and inwardly from the circular peripheral edges thereof, a shell sizing assembly comprising a sizing die, a cap engaged therewith and having said sizing die telescoped therein, said sizing die being cylindrical in shape and having a tapered bore formed vertically therethrough for accomodating the shell therein, said cap being cylindrical in shape and having a bore formed therein of sufficient dimensions to telescopically receive the upper portion of the sizing die and the upper portion of the shell, said cap bore having a toroidal shoulder therein which engages the upper edge of said sizing die and limits the movement of said sizing die within said cap.

4. In a shotgun shell loading device for use in reshaping used, deformed, charged shells having lower portions with dished, circular bottoms and circular flanges projecting upwardly therefrom and inwardly from the circular peripheral edges thereof, a shell sizing assembly comprising a sizing die, a cap engaged therewith and having said sizing die telescoped therein, said sizing die being cylindrical in shape and having a tapered bore formed vertically therethrough for accommodating the shell therein, said cap being cylindrical in shape and having a bore formed therein of sufficient dimensions to telescopically receive the upper portion of the sizing die and the upper portion of the shell, said cap bore having a toroidal shoulder therein which engages the upper edge of said sizing die and limits the movement of said sizing die within said cap, said cap bore having walls tapering upwardly and inwardly from the edge of said shoulder for forming the initial inward crimp of the top of the shell.

5. In a shotgun shell loading device for use in reshaping used, deformed, charged shells having lower portions with dished, circular bottoms and circular flanges projecting upwardly therefrom and inwardly from the circular peripheral edges thereof, a shell sizing assembly comprising a sizing die, a cap engaged therewith and having said sizing die telescoped therein, said sizing die being cylindrical in shape and having a tapered bore formed vertically therethrough for accommodating the shell therein, said cap being cylindrical in shape and having a bore formed therein of sufficient dimensions to telescopically receive the upper portion of the sizing die and the upper portion of the shell, said cap bore having a toroidal shoulder therein which engages the upper edge of said sizing die and limits the movement of said sizing die within said cap, a circular projection mounted in said cap and extending downwardly from the bottom of said cap bore and concentric with the peripheral surface thereof for forming the crimp in the top of the shell.

6. For use in reloading and reshaping used, deformed shells having lower portions with dished, circular bottoms and circular flanges projecting upwardly therefrom and inwardly from the circular peripheral edges thereof, the combination of a sizing die for confining a charged shotgun shell, a cap telescopically receiving the upper portion of said die, and means engaged with said cap for pressure urging said cap over said sizing die, said sizing die including a cylindrical body, a bore formed vertically through said body providing an open upper end and an open lower end for receiving the shell from one end and having it discharged from said one end of the bore, the wall of said bore tapering upwardly and inwardly for decreasing the diameter of the upper end of the shell as the latter is passed through the bore whereby entrance of the shell into the chamber of a gun is rendered easier, the lower peripheral edge of said body being disposed in a plane perpendicular to the longitudinal axis of the body to define a shell flange engaging seat, said cap being cylindrical in shape and having a bore formed therein of sufficient dimensions to telescopically receive the upper portion of the sizing die and the upper portion of the shell.

7. The assembly of claim 6 wherein said pressure urging means includes a base upon which said sizing die is seated, a stand rising from said base, a carriage movably carried by said stand, means for raising and lowering said carriage, and means mounting said cap on said carriage.

8. In a shotgun shell loading apparatus, a support and a carriage mounted thereon for vertical sliding movement, a vertically elongated loading tube carried by said carriage for vertical sliding movement therewith, means mounting said tube on said carriage for vertical sliding movement relative thereto, a spring engaging said tube and carriage and yieldingly resisting upward movement of the former relative to the latter, indicator means on said tube comprising a circumferentially extending groove on said tube registerable with the upper end of a shotgun shell loaded with powder and wads when the tube is disposed within the shell and compresses said wads and powder with the entire force of said spring.

9. The combination of claim 8 wherein said groove is of such size that registration of its lower edge and its upper edge selectively with said upper end of said shotgun shell will indicate the proper height of wad and powder columns in the shell for different powder charges.

10. A method of reforming and loading used shotgun shells of the type having a battery cup inserted in an aperture in the base of a shell, a primer cap frictionally engaged in said battery cup and with an anvil frictionally received in said battery cup within said primer cap; said method including in a continuous operation and a single apparatus of the type having a sizing die, the steps of removing the spent igniter from the base of the shell, installing a new igniter, introducing a charge of powder, inserting powder wads, tamping the wads upon the powder, introducing a charge of shot forming a partial crimp in the top of the shell and then completing the crimp while maintaining the shell against expansion in a sizing die, ejecting the completed shell from the sizing die, the step of tamping the wads including the component step of simultaneously gauging the height of the column of powder and wads in the shell, and simultaneously indicating the application of a fixed uniform tamping pressure to the wads.

11. A method of forming a crimp constituting a closure for the top of a loaded shotgun shell comprising the steps of bending the top portion of the side walls of the shell inwardly and forming thereby an upwardly extending cone, folding the junction of the cone and side wall downwardly within the side wall and thereby providing a bend projecting inwardly into the side wall, thereafter applying force to said cone and forcing the latter inwardly into a flat closure wall for the shell with the edges of said closure wall being forced under said bend and against said side wall, said method being performed while maintaining the force applied to the load of the shell to a predetermined amount.

12. A method of sizing a loaded shotgun shell to an external diameter which is progressively smaller from the rim towards the open end of the shell which includes the step of reducing and tapering the external diameter of the shell from above the wads to within one-quarter inch from the open end of the shell and thereby locking the wads behind a smaller diameter of the shell and increasing the confinement of the load of the shell.

13. The method of claim 12 including the further step of folding the last one-quarter inch of the shell inwardly and still further confining and retaining the entire charge of the shell and affording controlled confinement thereof.

14. A method of reforming and loading used shotgun shells of the type having a battery cup inserted in an aperture in the base of the shell, a primer cap frictionally engaged in said battery cup and with an anvil frictionally received in said battery cup within said primer cap; said method including in a continuous operation and in a single apparatus of the type having a sizing die, the steps of removing the spent igniter from the base of the shell, installing a new igniter, introducing a charge of powder, inserting powder wads, tamping the wads upon the powder, introducing a charge of shot, forming a partial crimp in the top of the shell and then completing the crimp while maintaining the shell against expansion in a sizing die, ejecting the completed shell from the sizing die, the step of removing the ignter being accompanied by the step of simultaneously straightening the battery cup.

15. A method of reforming and loading used shotgun shells of the type having a battery cup inserted in an aperture in the base of the shell, a primer cap frictionally engaged in said battery cup and with an anvil frictionally received in said battery cup within said primer cap; said method including in a continuous operation and in a single apparatus of the type having a sizing die, the steps of removing the spent igniter from the base of the shell, installing a new igniter, introducing a charge of powder, inserting powder wads, tamping the wads upon the powder, introducing a charge of shot, forming a partial crimp in the top of the shell and then completing the crimp while maintaining the shell against expansion in a sizing die, ejecting the completed shell from the sizing die, the step of removing the igniter including the component steps of removing the spent primer cap and straightening the battery cup simultaneously therewith, repositioning the anvil in the straightened battery cup and then inserting a new primer cap.

16. A method of reforming and loading used shotgun shells of the type having a battery cup inserted in an aperture in the base of the shell, a primer cap frictionally engaged in said battery cup and with an anvil frictionally received in said battery cup within said primer cap; said method including in a continuous operation and in a single apparatus of the type having a sizing die, the steps of removing the spent igniter from the base of the shell, installing a new igniter, introducing a charge of powder, inserting powder wads, tamping the wads upon the powder, introducing a charge of shot, forming a partial crimp in the top of the shell and then completing the crimp while maintaining the shell against expansion in a sizing die, ejecting the completed shell from the sizing die, the step of removing the igniter being accompanied by the step of simultaneously straightening the battery cup and is accompanied simultaneously by the further step of straightening the base of the shell.

17. A method of reforming and loading used shotgun shells of the type having a battery cup inserted in an aperture in the base of the shell, a primer cap frictionally engaged in said battery cup and with an anvil frictionally received in said battery cup within said primer cap; said method including in a continuous operation and in a single apparatus of the type having a sizing die, the steps of removing the spent igniter from the base of the shell, installing a new igniter, introducing a charge of powder, inserting powder wads, tamping wads upon the powder, introducing a charge of shot, forming a partial crimp in the top of the shell and then completing the crimp while maintaining the shell against expansion in a sizing die, ejecting the completed shell from the sizing die, the step of removing the spent igniter being accompanied by the steps of straightening the battery cup, straightening the base of the shell and resealing the battery cap in the base wad of the shell.

References Cited in the file of this patent

UNITED STATES PATENTS

| | | |
|---|---|---|
| 221,971 | Murry | Nov. 25, 1879 |
| 222,162 | Spencer | Dec. 2, 1879 |
| 242,676 | Morris | June 7, 1881 |
| 320,219 | Chamberlin | June 16, 1885 |
| 547,058 | Barlow | Oct. 1, 1895 |
| 1,058,523 | Auchu | Apr. 8, 1913 |
| 2,031,850 | Peterson | Feb. 25, 1936 |
| 2,300,367 | Harmon | Oct. 27, 1942 |
| 2,336,065 | Cadham | Dec. 7, 1943 |
| 2,336,216 | Birkigt | Dec. 7, 1943 |
| 2,352,549 | Johnson et al. | June 27, 1944 |
| 2,748,648 | Miller | June 5, 1956 |
| 2,749,791 | Miller | June 12, 1956 |
| 2,800,830 | Gerstenberger | July 30, 1957 |
| 2,807,186 | Veum | Sept. 24, 1957 |
| 2,819,644 | Corcoran | Jan. 14, 1958 |

FOREIGN PATENTS

| | | |
|---|---|---|
| 5,373 | Great Britain | Apr. 17, 1886 |